(12) United States Patent
Wang et al.

(10) Patent No.: US 12,177,072 B1
(45) Date of Patent: Dec. 24, 2024

(54) DATA STORAGE SYSTEM AND METHOD, STORAGE MEDIUM, AND ELECTRONIC DEVICE

(71) Applicant: ZHEJIANG LAB, Hangzhou (CN)

(72) Inventors: Peilei Wang, Hangzhou (CN); Ruyun Zhang, Hangzhou (CN); Jun Zhu, Hangzhou (CN); Tao Zou, Hangzhou (CN); Shunbin Li, Hangzhou (CN); Qi Xu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/555,805

(22) PCT Filed: Jul. 13, 2023

(86) PCT No.: PCT/CN2023/107329
§ 371 (c)(1),
(2) Date: Oct. 17, 2023

(30) Foreign Application Priority Data

Jun. 14, 2023 (CN) .......................... 202310705249.1

(51) Int. Cl.
*H04L 41/082* (2022.01)
*H04L 41/0894* (2022.01)
*H04L 67/1097* (2022.01)

(52) U.S. Cl.
CPC ........ *H04L 41/082* (2013.01); *H04L 41/0894* (2022.05); *H04L 67/1097* (2013.01)

(58) Field of Classification Search
CPC .............. H04L 41/082; H04L 41/0894; H04L 67/1097
See application file for complete search history.

(56) References Cited

U.S. PATENT DOCUMENTS 11,513,772 B1  11/2022  Gross
2002/0184349 A1*  12/2002  Manukyan .......... G06F 9/44505
709/221

(Continued)

FOREIGN PATENT DOCUMENTS

CN  111311319 A  6/2020
CN  112363714 A  2/2021

(Continued)

OTHER PUBLICATIONS

ISA State Intellectual Property Office of the People's Republic of China, International Search Report Issued in Application No. PCT/CN2023/107329, Feb. 22, 2024, WIPO, 8 pages. (Submitted with Machine Translation).

(Continued)

*Primary Examiner* — Viet D Vu
(74) *Attorney, Agent, or Firm* — The Small Patent Law Group LLC; Christopher R. Carroll (57) ABSTRACT

A data storage system includes: a server, a client and a control end; the control end is configured to generate a configuration file, and send the configuration file to the client and the server; the client is configured to generate an encapsulation rule based on the configuration file, generate a storage request, perform encapsulation on the storage request to obtain a message packet, and send the message packet to the server; the server is configured to generate an extraction unit and an action unit based on the configuration file, analyze the message packet to obtain the target information, write the target information into each extraction unit, read action information and determine an action unit matching the action information as a target action unit, and execute the storage actions corresponding to the target action unit to store byte stream data of the target information.

16 Claims, 4 Drawing Sheets

(56) References Cited

U.S. PATENT DOCUMENTS

2009/0287617 A1 11/2009 Schmidt
2022/0021615 A1* 1/2022 Boutros ................ H04L 61/256

FOREIGN PATENT DOCUMENTS

| CN | 112714148 | A | 4/2021 |
| CN | 113722394 | A | 11/2021 |
| CN | 114115967 | A | 3/2022 |
| CN | 114222256 | A | 3/2022 |
| CN | 114911482 | A | 8/2022 |
| CN | 115951947 | A | 4/2023 |
| CN | 116107999 | A | 5/2023 |
| CN | 116436936 | A | 7/2023 |
| KR | 20050093552 | A | 9/2005 |
| KR | 20220060708 | A | 5/2022 |

OTHER PUBLICATIONS

ISA State Intellectual Property Office of the People's Republic of China, Written Opinion of the International Searching Authority Issued in Application No. PCT/CN2023/107329, Feb. 22, 2024, WIPO, 8 pages. (Submitted with Machine Translation).
State Intellectual Property Office of the People's Republic of China, Office Action and Search Report Issued in Application No. 202310705249.1, Jul. 20, 2023, 7 pages.(Submitted with Machine/ Partial Translation).
Watkins etc."Programmable Storage" "UC Santa Cruz Electronic Theses and Dissertations" Dec. 31, 2018,213 pages.
Wang Li etc. "A Extensible Design of Mobile Police System Based on Component" "58 2008 Radio Engineering V01.38 No. 2" Feb. 5, 2008, 4 Pages.

* cited by examiner

| Configuration file | Service table | | | |
|---|---|---|---|---|
| | Matching register | Matching value | Action | Result register |
| Third configuration information | E4 | "set" | setStrAct | R1 |
| | E4 | "get" | getStrAct | R1 |
| | E4 | "hset" | setDictAct | R1 |
| | E4 | "hget" | getDictAct | R1 |

DATA STORAGE SYSTEM AND METHOD, STORAGE MEDIUM, AND ELECTRONIC DEVICE

CROSS REFERENCE TO RELATED APPLICATIONS

This application is a national phase entry of, and claims priority to International Patent Application No. PCT/CN2023/107329 (filed Jul. 13, 2023), which claims priority to Chinese Patent Application No. 202310705249.1 filed on Jun. 14, 2023, the entire contents of which are incorporated herein by reference.

TECHNICAL FIELD

The present disclosure relates to the field of computer technologies, and in particular to a data storage system and method, a storage medium, and an electronic device.

BACKGROUND

In recent years, the programmable network systems with Software Defined Network (SDN) as representative are emerging. Compared with conventional networks, the programmable network systems can quickly achieve custom designing and deployment of services such as network protocol and network topology and the like based on the continuously-changing requirements of the users, so as to get rid of the limitation of the hardware for network architecture.

However, the existing programmable networks are mainly used for the forwarding function of the network requests and when used for storage services of byte streams, cannot achieve dynamic design and update for the network configurations of the storage services, showing lack of flexibility. Thus, it is difficult to satisfy the requirements of users (developers) for the dynamic design and deployment of the storage services.

As a result, it is urgent to solve the problem of how to achieve dynamic programming and update of storage services of network byte streams to satisfy the requirements of users for dynamic design and deployment.

SUMMARY

The present disclosure provides a data storage system and method, a storage medium and an electronic device so as to partially solve the problems in the prior arts.

The present disclosure adopts the following technical solutions.

The present disclosure provides a data storage system, including a server, a client and a control end;
  the control end is configured to provide a programming environment for a first user, generate a configuration file based on programming information written by the first user in the programming environment, and send the configuration file to the client and the server;
  the client is configured to receive the configuration file, generate an encapsulation rule based on first configuration information in the configuration file, generate a storage request corresponding to a byte stream of target information in response to a specified operation of a second user, perform encapsulation on the storage request based on the encapsulation rule to obtain a message packet, and send the message packet to the server;
  the server is configured to receive the configuration file, generate at least one extraction unit matching the encapsulation rule based on second configuration information in the configuration file, generate an action unit corresponding to at least one group of storage actions based on third configuration information in the configuration file, analyze the message packet after receiving the message packet to obtain the target information, write the target information into each extraction unit, read action information from a specified extraction unit and determine an action unit matching the action information as a target action unit, and execute the storage actions corresponding to the target action unit to store byte stream data of the target information.

In an embodiment, the client further includes: a programmable encapsulation module and an encapsulation instruction set;
  the programmable encapsulation module is configured to load the configuration file, generate at least one encapsulation unit based on the first configuration information, and sort each encapsulation unit to obtain the encapsulation rule;
  the encapsulation instruction set is configured to abstract an operation involved in a process of performing encapsulation on the byte stream of the target information based on the encapsulation rule.

In an embodiment, the server includes: a programmable extraction module, a programmable action module and a programmable service module;
  the programmable extraction module is configured to load the configuration file, generate each extraction unit based on the second configuration information, and analyze the message packet based on the configuration file to extract the target information and write the target information into an extraction register corresponding to each extraction unit;
  the programmable action module is configured to load the configuration file, select each target instruction from a preset action instruction set based on the third configuration information, combine the storage action corresponding to each target instruction, and generate each action unit based on each group of storage actions;
  the programmable service module is configured to load the configuration file, based on fourth configuration information in the configuration file, take the action information stored in the extraction register corresponding to the specified extraction unit as a matching object and determine a matching value, and match the target action unit based on the matching value.

In an embodiment, the server is further configured to: based on the configuration file, update configurations corresponding to the programmable extraction module, the programmable action module and the programmable service module.

In an embodiment, the configuration of the programmable extraction module includes: extraction position offset amount, extraction character length, and extraction terminator and associated extraction register;
  the offset amount includes a fixed value and a variable value and the variable value is determined based on the terminator;
  the character length includes a fixed length and a variable length, and the variable length is determined based on the terminator.

In an embodiment, the programmable action module includes: a basic action table and an action unit, and the action unit is used to select a storage action corresponding to a specified register from the basic action table and perform association.

In an embodiment, the server is further configured to:
based on the fourth configuration information in the configuration file, generate a service table, and associate each specified extraction unit with each action unit in the service table, and,
based on the action information in the specified extraction unit, search the service table, and take an action unit obtained from the service table as the target action unit.

In an embodiment, the server is further configured to return an execution result of the storage actions corresponding to the target action unit to the client.

The present disclosure provides a data storage method, including:
obtaining, by a server, a message packet from a client, and analyzing the message packet to obtain target information; where the message packet is obtained after the client generates a storage request corresponding to a byte stream of target information in response to a specified operation of a second user, and performs encapsulation on the storage request based on an encapsulation rule, the encapsulation rule is generated based on first configuration information in a configuration file sent by a control end, and the configuration file is generated by the control end based on programming information written by a first user in a programming environment;
writing the target information into each extraction unit;
reading action information from a specified extraction unit and determining an action unit matching the action information as a target action unit, where the server includes at least one extraction unit generated based on second configuration information in the configuration file and at least one action unit generated based on third configuration information in the configuration file, each extraction unit matches the encapsulation rule and each action unit corresponds to one group of storage actions;
executing the storage actions corresponding to the target action unit to store byte stream data of the target information.

In an embodiment, the client includes: a programmable encapsulation module and an encapsulation instruction set;
the encapsulation rule is obtained after the programmable encapsulation module loads the configuration file, generates at least one encapsulation unit based on the first configuration information and sorts each encapsulation unit, and an operation involved in the process of performing encapsulation on the byte stream of the target information based on the encapsulation rule is abstracted based on the encapsulation instruction set.

In an embodiment, the server is provided with at least one of a programmable action module and a programmable service module;
before analyzing the message packet, the method further includes:
by the programmable action module in the server, loading the configuration file, selecting each target instruction from a preset action instruction set based on the third configuration information, combining the storage action corresponding to each target instruction, and generating each action unit based on each group of storage actions;
reading the action information from the specified extraction unit and determining the action unit matching the action information include:

by the programmable service module in the server, loading the configuration file, based on fourth configuration information in the configuration file, taking the action information stored in an extraction register corresponding to the specified extraction unit as a matching object and determining a matching value, and matching the target action unit based on the matching value.

In an embodiment, the server is further provided with a programmable extraction module;
the method further includes:
based on the configuration file, updating configurations corresponding to the programmable extraction module, the programmable action module and the programmable service module.

In an embodiment, the configuration of the programmable extraction module includes extraction position offset amount, extraction character length, and extraction terminator and associated extraction register; the offset amount includes a fixed value and a variable value and the variable value is determined based on the terminator; the character length includes a fixed length and a variable length, and the variable length is determined based on the terminator.

In an embodiment, the programmable action module includes: a basic action table and an action unit;
generating each action unit based on each group of storage actions includes:
by using the action unit, selecting a storage action corresponding to a specified register from the basic action table and performing association.

In an embodiment, before analyzing the message package, the method further includes:
based on the fourth configuration information in the configuration file, generating a service table, and associating each specified extraction unit with each action unit in the service table;
reading the action information from the specified extraction unit and determining the action unit matching the action information as the target action unit includes:
based on the action information in the specified extraction unit, searching the service table, and taking an action unit obtained from the service table as the target action unit.

In an embodiment, the method further includes:
returning an execution result of the storage actions corresponding to the target action unit to the client.

The present disclosure provides a non-transitory computer readable storage medium, storing computer programs thereon, where the computer programs, when executed by a processor, cause the processor to perform the above data storage method.

The present disclosure provides an electronic device, including: a processor; and a memory storing computer programs executable by the processor, where the processor is configured to, when executing the computer programs, perform the above data storage method.

BRIEF DESCRIPTION OF THE DRAWINGS

The accompanying drawings mentioned herein are used to provide further understanding of the present disclosure and constitute a part of the present disclosure. The illustrative embodiments and its descriptions of the present disclosure are used to interpret the present disclosure rather than make improper limitation to the present disclosure.

FIG. 0.6 is a flowchart illustrating a data storage method according to one or more embodiments of the present disclosure.

DETAILED DESCRIPTION OF THE EMBODIMENTS

In order to make the objects, technical solutions and advantages of the embodiments of the present disclosure clearer, the technical solutions of the embodiments of the present disclosure will be fully and clearly described below in combination with the accompanying drawings and specific embodiments. Apparently, the embodiments described herein are merely some embodiments of the present disclosure rather than all embodiments. Other embodiments obtained by those skilled in the art based on these embodiments without making creative work shall all fall within the scope of protection of the present disclosure.

The technical solutions provided by the embodiments of the present disclosure will be detailed below in combination with drawings.

Figure 1:
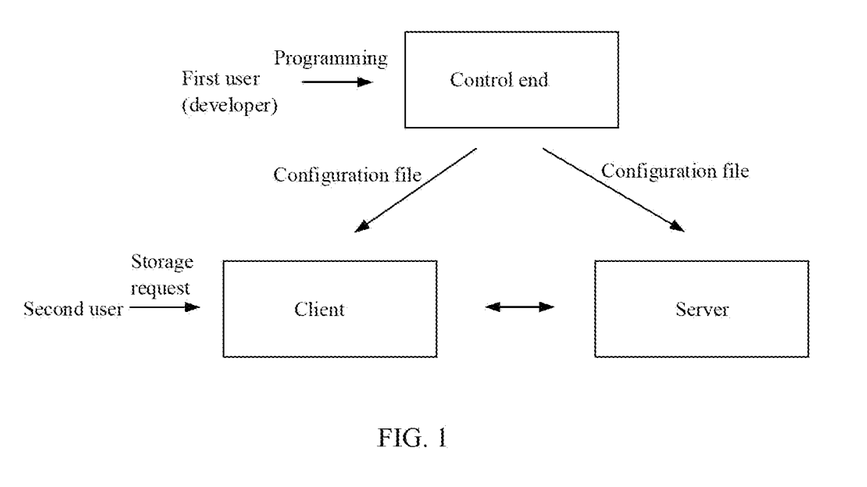
FIG. 1 is a structural schematic diagram illustrating a data storage system according to one or more embodiments of the present disclosure.

FIG. 1 is a schematic diagram illustrating a data storage system according to the present disclosure. The data storage system includes a client, a server and a control end.

In some embodiments, the control end, the server and the client may be implemented by different computer devices. The control end is configured to provide a programming environment for a first user, convert programming information written by the first user in the programming environment into a configuration file, and send the configuration file to the client and the server. In the present disclosure, the first user may be a developer or manager of a service system.

The above programming environment may include direct programming and indirect programming. For the direct programming, the first user (developer) may directly write a configuration file and then directly distribute the configuration file by the control end, which is equivalent to a process of performing computer programming with machine codes or assembly language. For the indirect programming, the first user firstly develops one set of compilation environment; then, performs programming with advanced language; after completing the programming, compiles a programming result based on the compilation environment to generate a configuration file and then distributes it by the control end. The indirect programming method may be available in many mature solutions, for example, P4 programming and compilation system currently applied to a programmable switch. In the present disclosure, the first user may write a configuration file by direct programming.

In the present disclosure, the format of the configuration file may be a format of JavaScript Object Notation (json) to multiplex existing json processing library and relevant interfaces. The control end encapsulates a json string in the configuration file into a message body of a Transmission Control Protocol (TCP) message and distributes it to the client and the server through tcp socket. A transmit-receive module of the client and the server maintains one multiplexing socket list used to, in real time, monitor json configuration information from the control end.

The client includes a user interaction interface, a transmit-receive module, a programmable encapsulation module, an encapsulation instruction set and an encapsulation register. When performing configuration on a storage system, the client may receive the configuration file distributed by the control end, call the programmable encapsulation module resource based on first configuration information in the configuration file to generate an encapsulation rule, and provide an interaction interface for a second user executing the storage service of network byte stream.

In an execution process of a storage request, the client may, in response to a specified operation (e.g. storage operation) of the second user, generate a storage request of network byte stream; perform encapsulation on the storage request based on the encapsulation rule to generate a network message packet; send the message packet to the server and receive response information from the server; feed the received response information back to the user via the interaction interface with the second user. It should be noted that, since the encapsulation rule is formed by multiple encapsulation units, the encapsulation rule may be expressed as a list formed by multiple encapsulation units.

The user interaction interface of the client is configured to receive a service request of a user and store user request information into the encapsulation register and feed a response result of a system back to the user upon obtaining the response result.

The transmit-receive module is configured to establish communication connection with the control end and the server to receive a configuration file from the control end and perform message transmission and reception with the server.

The programmable encapsulation module is configured to load the configuration file distributed by the control end, generate an encapsulation unit with a unique identifier based on first configuration information in the configuration file, sort each encapsulation unit to generate an encapsulation rule, and based on the encapsulation rule, perform encapsulation on a storage request corresponding to byte stream of target information.

The encapsulation instruction set is configured to abstract an operation involved in a process of performing encapsulation on the byte stream of the target information based on the encapsulation rule, including but not limited to extracting a field length, switching between integer and character string, and copying a character string.

The encapsulation register is configured to store storage request information input by the second user.

Specifically, the user interaction interface run by the client obtains the byte stream of the target information, partition the byte stream input by the second user into byte segments by using space, and take a new line character as a termination identifier of the byte stream input in single time. After completing the partitioning, the client calls the encapsulation units to perform information filling on the partitioned byte segments and then the transmit-receive module of the client may, based on information of the encapsulation units, generate a message packet and send it to the server. For ease of understanding, the present disclosure provides a schematic diagram illustrating a process in which the client sends the message packet, as shown in FIG. 2.

Figure 2:
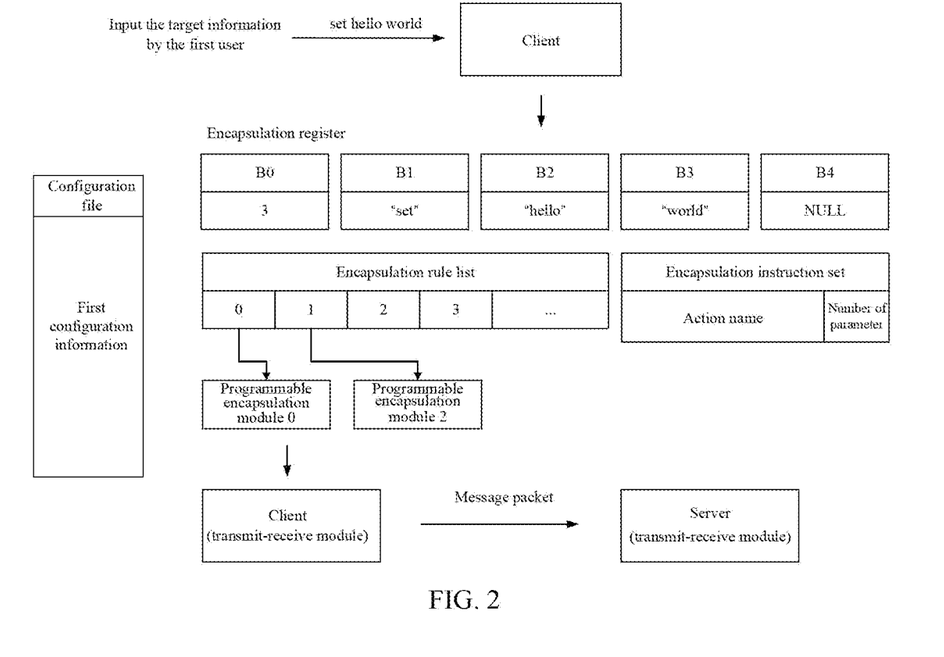
FIG. 2 is a schematic diagram illustrating a process in which a client sends a message packet according to one or more embodiments of the present disclosure.

FIG. 2 is a schematic diagram illustrating a process in which the client sends the message packet according to the present disclosure.

The codes of the first configuration information in the configuration file can be expressed as:

{"name": "programmableBuild","version": 1,
"fields": [{"name": "itemNumBegin","length": 3, "value": "*\r\n" },
{"name": "itemNum","value": {"command": "toString", "parameter":
{"command": "getNum", "parameter": "B0" }},
"terminator": "\r\n" "terminatorLength": 2},
{"name": "itemBegin", "length": 1, "value": "$" },
{"name": "item","value": {"command": "toString","parameter":
{"command": "getLength","parameter":"B1" } }"terminator":"\r\n" "terminatorLength": 2} ]}

The transmit-receive module of the client obtains a configuration file of jason format. The value of the "fields" item in the first configuration information is one array type, and each item in the array corresponds to the configuration of one encapsulation unit. The configuration of the encapsulation units mainly includes length information and content information. The length information includes two types: fixed length and variable length; the content information also includes two types: fixed content and variable content. For the fixed length, for example, the acii characters '*', '\r' and 'n' are filled with a fixed length of three bytes into the encapsulation unit 0 in the encapsulation rule list shown in FIG. 2. In this encapsulation unit, int length=1 and char*buf="*" are used to represent the start of the entire byte stream service request.

The encapsulation unit 1 in the encapsulation rule list uses the type of variable length and variable content, and calls a toString encapsulation instruction to convert the information of int type in the encapsulation register B0 into a character string and fill it into its own buf. In this encapsulation unit, int length=1 and char*buf="3" are assigned after calling cmd interface and expressed as: cmd_t*cmd=toString(getNum(B0)).

The encapsulation register is used to store the target information input by the first user. When the first user inputs a storage request corresponding to a network byte stream "set hello world", B0 is fixedly used to store a number of information items of the byte stream request input by the user in single time, and B1 to Bn are used to sequentially store the contents of each information item input by the user. In this embodiment, the user interaction of the client is performed by command line, with a space as separator of the information items and a new line character as terminator of single interaction command.

The encapsulation instruction set is an interface function of a series of pre-prepared encapsulation actions and may include logical actions such as get Num, get Length, get String, to String and the like.

An input parameter of the interface function may include two types which are contents of the encapsulation register and a return value of another interface function. Correspondingly, the return value of the interface function also includes two purposes: the return value is used as an input parameter of another interface function; and the return value is written into a content buffer zone of the encapsulation unit.

In practical applications, if the encapsulation instruction set, the encapsulation register and the encapsulation unit are implemented with C language or go language or the like, they can be defined as structural body. If they are implemented with C++ or python or the like, they can be defined as class. In the present disclosure, one client with basic functions is implemented with C language with additionally-defined structural bodies such as encapsulation register, and the encapsulation units defined in the configuration file are connected to form a sequence chain list. As shown in FIG. 2, when the user inputs a byte stream storage request of "SET HELLO WORLD", the responding encapsulation register, the encapsulation rule list and the encapsulation units are filled with information as shown in FIG. 2 and finally, the transmit-receive module, based on information in the encapsulation rule list, generates a character string "*3\r\n$3\r\nset\r\n$5\r\nhello\r\n$5\r\n world\r\n" of a message packet by splicing and then send it to the server.

The server includes a transmit-receive module, a programmable extraction module, a programmable action module and a programmable service module. When performing configuration on a storage system, the server may receive the configuration file from the control end, call the programmable extraction module resource based on second configuration information in the configuration file to generate a plurality of extraction units with a unique identifier, call the programmable action module resource based on third configuration information in the configuration file to generate a plurality of action units with a unique identifier, and generate a service table based on fourth configuration information in the configuration file, and perform association on service table information, specified extraction unit and each action unit in the service table. The information stored in an extraction register of above specified extraction unit is used to indicate storage actions corresponding to a storage request.

When executing a storage request, the server may receive a message packet from the client, obtain a network message, call a programmable extraction module interface, write information into each extraction unit, search the service table based on information in the specified extraction unit to obtain an associated action unit, perform actions in the action unit and feed an execution result back to the client via the transmit-receive module.

The transmit-receive module is used to perform message transmission and reception with the client.

The programmable extraction module is configured to load the configuration file distributed by the control end, and based on the second configuration information in the configuration file, analyze the received message packet of the storage request from the client to extract the target information corresponding to the storage request, and then, store the extracted target information into the extraction register corresponding to each extraction unit.

The programmable action module is configured to load the configuration file distributed by the control end, select target instructions from an action instruction set based on third configuration information in the configuration file and combine the storage actions corresponding to the target instructions so as to form a group of one set of logical actions, and then perform unique identification or designation on each group of storage actions to form one action unit.

It should be noted that the programmable action module is provided with a basic action table and the above action unit, where the action unit is used to select a storage action corresponding to a specified register from the basic action table and perform association.

The programmable service module is configured to construct a service table, based on fourth configuration information in the configuration file, take the action information stored in the extraction register corresponding to the specified extraction unit as a matching object and determine a matching value, and match the target action unit based on the matching value, and when completing the matching, execute the storage actions corresponding to the target action unit.

After receiving the configuration file, the server may update configuration of the programmable extraction module, where the configuration includes extraction position offset amount, extraction character length, and extraction terminator and associated extraction register; the offset amount includes a fixed value and a variable value and the variable value is determined based on the terminator; the extraction character length includes a fixed length and a variable length, and the variable length is calculated based on the terminator. For ease of understanding, the present disclosure provides a schematic diagram illustrating an analysis process of a message packet, as shown in FIG. 3.

Figure 3:
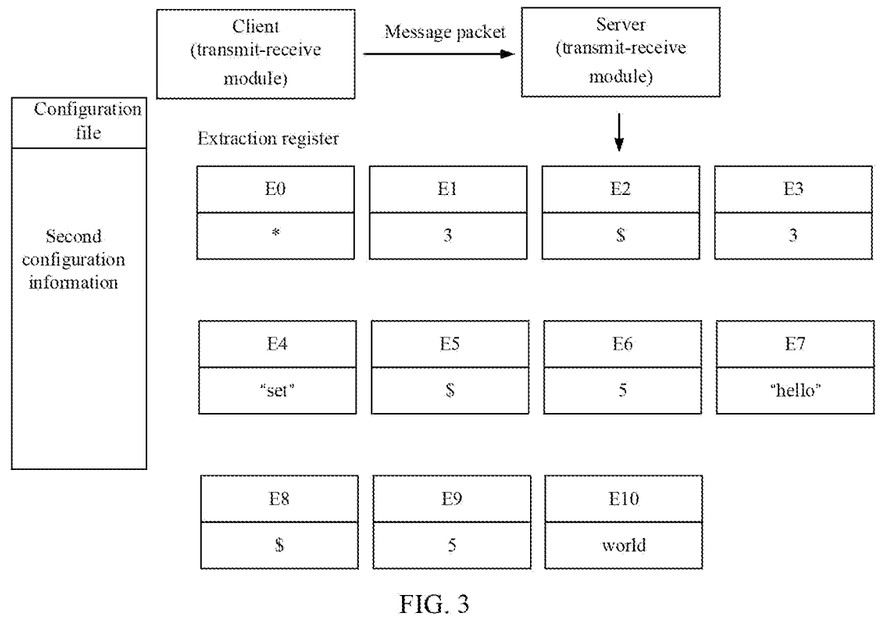
FIG. 3 is a schematic diagram illustrating an analysis process of a message packet according to one or more embodiments of the present disclosure.

FIG. 3 is a schematic diagram illustrating an analysis process of a message packet according to the present disclosure.

The codes of the second configuration information can be expressed as:

{"name": "programmable Extract", "version": 1,"fields":
[{"offset": 0, "length": 1, "register": "E0" },
{"offset": 3,"length": 0,"terminator": "\r\n","terminator-Length": 2,"register": "E1" },
{"offset": 0, "length": 3, "register": "E2" },
{"offset":3,"length":0,"terminator":"\r\n","terminator-Length":2,"register":"E1" }, . . . ] }

A single extraction register in the programmable extraction module is defined as one structural body such that each extraction register corresponds to one extraction unit. The structural body of the message packet includes two parts: state information and data buffer zone. The programmable extraction module extracts the data in the specific fields in the byte stream sequentially into the data buffer zone of the extraction registers, and updates the corresponding state information. The structural bodies of a plurality of extraction registers form one list to facilitate subsequent traversal operation.

After receiving the configuration file, the server updates the configuration of the programmable action module. The programmable action module includes a basic action table and an action unit, where the action unit is used to select specific actions from the basic action table and associate them with the above specified extraction registers and perform unique identification or designation to obtain the configuration of the action unit. For ease of understanding, the present disclosure further provides a structural schematic diagram illustrating a configuration of an action unit, as shown in FIG. 4.

Figure 4:
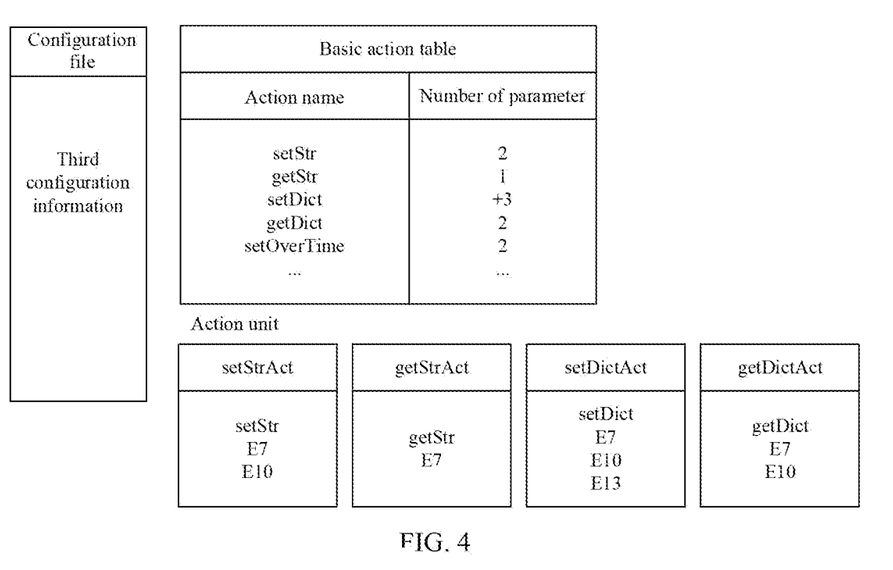
FIG. 4 is a schematic diagram illustrating a configuration structure of an action unit according to one or more embodiments of the present disclosure.

FIG. 4 is a structural schematic diagram illustrating a configuration of an action unit according to the present disclosure.

The codes of the third configuration information can be expressed as:

{"name": "programmable Action", "version": 1,
"actions": [{"name": "setStrAct", "action": "setStr", "parameters": "E7,E10" },
{"name": "getStrAct", "action": "getStr", "parameters": "E7" } . . . ]}

The actions in the basic action table are abstractions on data storage actions and include access of data of character string and dictionary type and timeout setting and the like. Based on the third information in the configuration file, a plurality of action units are set, and FIG. 4 lists the configurations of four action units, for which actions such as setStr, getStr, setDict and getDict in the basic action table are selected and specific extraction registers are selected as parameters. Actually, the basic action table is implemented by using structural body. The items in the structural body are function pointers which correspond to the action names in the encapsulation instruction set in FIG. 2. For the specific implementation of the function, a library encapsulated with go language or the like is directly multiplexed.

Figure 5:
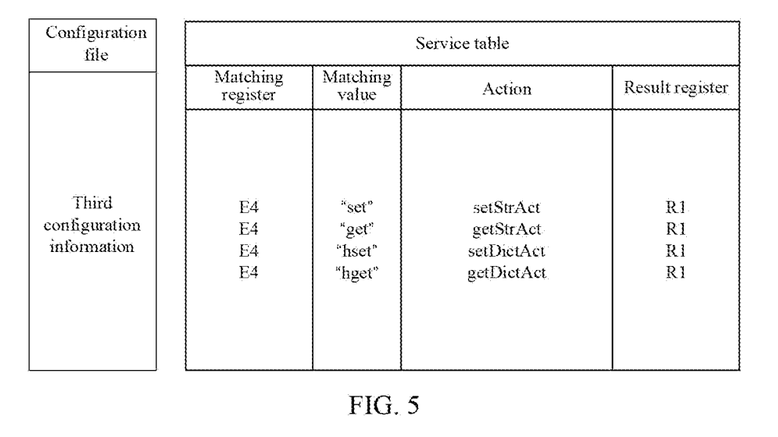
FIG. 5 is a structural schematic diagram illustrating a service table according to one or more embodiments of the present disclosure.

After receiving the configuration file, the server may, based on the fourth configuration information in the configuration file, update the configuration of the programmable service module, which specifically includes: constructing a service table, including a matching register, a matching value and action information, where the matching register is a register corresponding to the above specified extraction unit, the matching value is obtained from the configuration file and written into the service table, and the action information is the action unit with unique identifier or designation.

The server may take the action information stored in the extraction register (matching register) corresponding to the specified extraction unit as a matching object and determine a matching value, and then based on the matching value, perform matching on the target action unit, and after completing the matching, execute the storage actions corresponding to the target action unit. For ease of understanding, the present disclosure provides a structural schematic diagram illustrating a service table, as shown in FIG. 5.

FIG. 5 is a structural schematic diagram of a service table according to the present disclosure.

The codes of the fourth configuration information can be expressed as:

{"name": "programmableServe", "version": 1,
"serve" [{"name": "setStr", "matchRegister":"E4" "matchValue": "set", "action": "setStrAct" },
{"name": "getStr", "matchRegister": "E4" "matchValue": "get", "action": "getStrAct" } . . . ] }

The service table may perform association on the extraction register, the action unit and the result register by using "matching value". In this embodiment, the service table is implemented through a map data structure of go language. The key of the map table is a matching value, and the matching value includes "set", "get", "hset" and "hget" and the like and is bound to a specified extraction register. As shown in FIG. 5, the extraction register E4 is set as matching register, and based on the above information, a first word in a command line input by the second user is stored in the E4.

When information is written into the E4, the programmable service module may, based on an information query service table in the E4, obtain the action information, i.e., the previously-defined programmable action unit, and then execute relevant action logic and write a result into the result register RI.

After obtaining the execution result, the server returns the execution result to the client via the transmit-receive module.

After executing the action unit, the server may, based on a return value of a set function, determine whether a current storage action is successfully executed. In the present disclosure, the commands are all executed serially, and thus, it is not required to add an output buffer zone pointer parameter to the command interface functions such as set function, but use one global data buffer zone as a buffer of the output result of each command of the server. For example, after the above instruction "SET HELLO WORLD" is executed, if the execution is successful, "OK" is written into the RI, and if the execution is erroneous, "ERROR" is written; correspondingly, if the instruction "GET HELLO" is executed, that is, the value corresponding to the "HELLO" key is obtained, the data written into RI is "WORLD".

The client receives the execution result returned by the server and feeds it back to the second user via the interaction interface.

In this embodiment, the client adopts a blocking mode in default, namely, the user no longer responds to the interaction requests of other commands after inputting the command "SET HELLO WORLD" and the like via the client and before obtaining the reply from the server. After the client obtains the execution result returned by the server, the client directly feeds the execution result back to the second user via the interaction interface, and thus the second user can obtain the execution result of the command.

The above is the data storage system provided by the present disclosure. A data storage method applied to the above data storage system in the present disclosure will be described below from the angle of method, as shown in FIG. 6.

Figure 6:
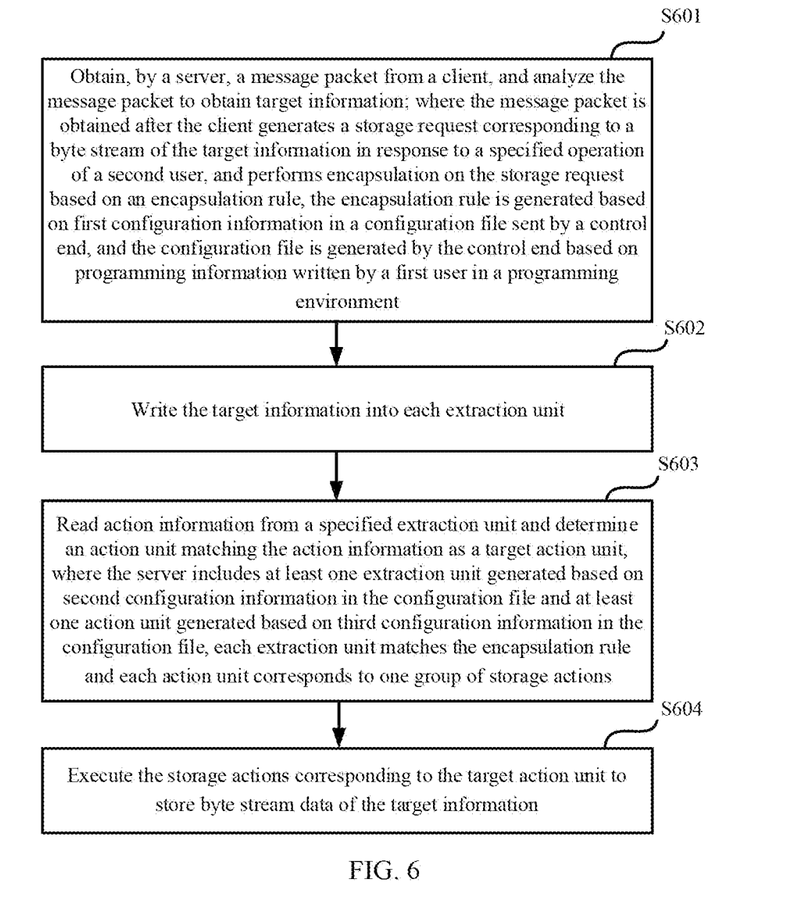

FIG. 6 is a flowchart illustrating a data storage method according to the present disclosure. The method includes the following steps.

At step S601, a server obtains a message packet from a client, and analyzes the message packet to obtain target information; where the message packet is obtained after the client generates a storage request corresponding to a byte stream of the target information in response to a specified operation of a second user, and performs encapsulation on the storage request based on an encapsulation rule, the encapsulation rule is generated based on first configuration information in a configuration file sent by a control end, and the configuration file is generated by the control end based on programming information written by a first user in a programming environment.

At step S602, the target information is written into each extraction unit.

At step S603, action information is read from a specified extraction unit and an action unit matching the action information is determined as a target action unit, where the server includes at least one extraction unit generated based on second configuration information in the configuration file and at least one action unit generated based on third configuration information in the configuration file, each extraction unit matches the encapsulation rule and each action unit corresponds to one group of storage actions.

At step S604, the storage actions corresponding to the target action unit are executed to store byte stream data of the target information.

When performing configuration on a storage system, the client may call a programmable encapsulation module resource based on the first configuration information in the configuration file to generate an encapsulation rule, and provide an interaction interface for a second user executing the storage service of network byte stream.

The server may call a programmable extraction module resource based on the second configuration information in the configuration file to generate a plurality of extraction units with a unique identifier, call a programmable action module resource based on the third configuration information in the configuration file to generate a plurality of action units with a unique identifier, and generate a service table based on the configuration file, and perform association on service table information, specified extraction unit and each action unit in the service table. The information stored in an extraction register of above specified extraction unit is used to indicate storage actions corresponding to a storage request.

When executing a storage request, the client may generate a storage request of network byte stream; perform encapsulation on the storage request based on the above encapsulation rule to generate a network message packet; send the message packet to the server and receive response information from the server; feed the received response information back to the user via the interaction interface with the second user.

The server may receive a message packet from the client, obtain a network message, call a programmable extraction module interface, write information into each extraction unit, search the service table based on information in the specified extraction unit to obtain an associated action unit, perform actions in the action unit and feed an execution result back to the client via the transmit-receive module.

It can be seen from the above contents that, in this solution, by abstracting the resources of the client and the server, the units such as programmable encapsulation, extraction and action and the like are provided to the user such that flexible configuration can be performed by the control end. Thus, the developer can perform flexible configuration on the service contents of the client and the server based on its own requirements, significantly expanding the application scenarios and use flexibility.

The present disclosure further provides a compute readable storage medium, storing computer programs, where the computer programs are executed to perform the data storage method shown in FIG. 6.

At least one technical solution employed in the present disclosure can bring the following beneficial effects.

The data storage system provided by the present disclosure includes a server, a client and a control end; the control end is configured to generate a configuration file based on programming information, and send the configuration file to the client and the server; the client is configured to generate an encapsulation rule based on the configuration file, generate a storage request, perform encapsulation on the storage request based on the encapsulation rule to obtain a message packet, and send the message packet to the server; the server is configured to generate an extraction unit and an action unit based on the configuration file, analyze the message packet, write the target information into each extraction unit, read action information from a specified extraction unit and determine an action unit matching the action information as a target action unit, execute the storage actions corresponding to the target action unit to store byte stream data of the target information.

It can be seen from the above method that the second user in the present solution can, at any time, perform configuration on the server and the client at the control end to generate an encapsulation rule at the client and abstract the action unit and the extraction unit at the server, and then perform programmable function configuration and scheduling on each abstracted module so as to achieve the storage services of byte stream data dynamically updated and edited. In this case, a developer can, on its own, perform configurations such as addition or modification or the like on the encapsulation rule and the storage actions to quickly and flexibly respond to the continuously-changing service requirements of the users, shorten development and deployment time and adapt to more complex application scenarios.

Figure 7:
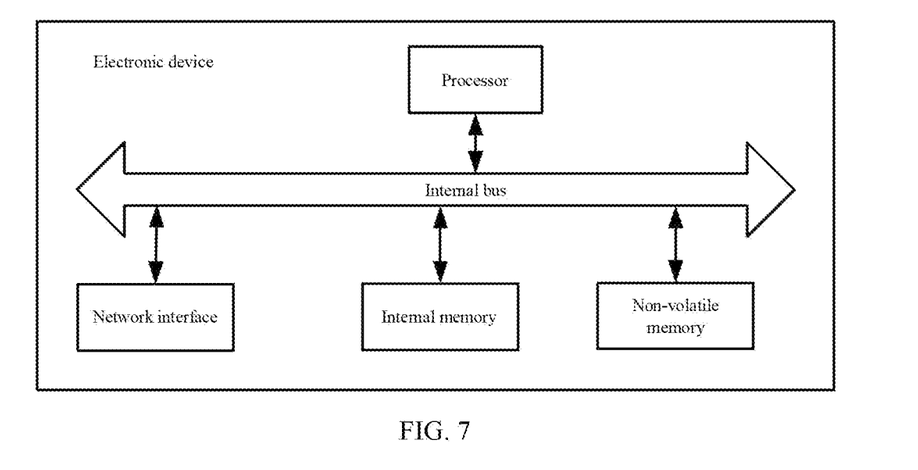
FIG. 7 is a schematic diagram illustrating an electronic device applied to FIG. 6 according to one or more embodiments of the present disclosure.

The present disclosure further provides a structural schematic diagram illustrating an electronic device corresponding to FIG. 6 as shown in FIG. 7. As shown in FIG. 7, from the hardware level, the electronic device includes a processor, an internal bus, a network interface, an internal memory and a non-volatile memory, and may also include hardware required by other services. The processor reads the corresponding computer programs from the non-volatile memory into the internal memory for running so as to perform the data storage method shown in FIG. 6. Of course, in addition to software implementation, the present disclosure may also be implemented in other ways, for example, may be implemented by logic device or combination of software and hardware or the like, and in other words, the execution subject of the following processing flow is not limited to each logic unit, and may also be hardware or logic device.

Whether one technical improvement is a hardware improvement (e.g., improvement on diode, transistor, switch and other circuit structures) or a software improvement (improvement on method flow) can be obviously determined. But, along with technological development, many improvements on method flows at present have been regarded as direct improvements for hardware circuit structures. Almost all of the designers program an improved method flow into a hardware circuit to obtain a corresponding hardware circuit structure. Therefore, it cannot be said that one improvement on method flow cannot be achieved by hardware entity modules. For example, Programmable Logic Device (PLD) (e.g., Field Programmable Gate Array (FPGA)) is such an integrated circuit, the logic function of which is determined by the programming of the user for the device. The designers can integrate one digital system into one sheet of PLD by programming, without requesting the chip manufacturers to design and manufacture a dedicated integrated circuit chip. Furthermore, nowadays, replacing the hand preparation of the integrated circuit chip, the programmings are mostly achieved by using "logic compiler" software, which is similar to the software compiler for development and drafting of the programs. But, for compiling the previous original codes, a specific programming language is to be used, which is called Hardware Description Language (HDL). The HDL includes not only one type but multiple, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL) and the like. The mostly common at present are Very-High-Speed Integrated Circuit Hardware Description Language (VHDL) and Verilog. Those skilled in the arts should understand that as long as logic programming on the method flow and programming to the integrated circuit are performed using the above several hardware description languages, the hardware circuit for implementing the logic method flow can be easily obtained.

The controller can be implemented in any proper way, for example, the controller may take the form of, for example, microprocessor, or processor, or computer readable medium storing computer readable program codes (e.g., software or firmware) executable on the (micro) processor, logic gate, switch, Application Specific Integrated Circuit (ASIC), programmable logic controller and embedded microcontroller. The examples of the controller may include but not limited to the following microcontrollers: ARC 625D, Atmel AT91SAM, Microchip PIC18F26K20 and Silicone Labs C8051F320, and the memory controller may also be implemented as a part of the control logic of the memory. Those skilled in the art also understand that, in addition to implementing the controller by pure computer readable program codes, logic programming may be performed on the method steps to enable the controller to achieve the same functions in the form of logic gate, switch, dedicated integrated circuit, programmable logic controller and embedded microcontroller and the like. Therefore, the controllers may be regarded as one type of hardware components, and the apparatuses for performing various functions inside the controllers can also be regarded as structures in the hardware components, or, the apparatuses for performing various functions are regarded as not only software modules for performing the methods but also structures in the hardware components.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a game console, a tablet computer, wearable device, or combinations of any several devices of these devices.

For the convenience of description, the above-mentioned apparatus, when described, is divided into various units by function for descriptions. Of course, when the present disclosure is implemented, the functions of the units can be implemented in one or more software and/or hardware.

Those skilled in the art should understand that the embodiments of the present disclosure may be provided as methods, systems, or computer program products. Therefore, the present disclosure may take the form of a pure hardware embodiment, a pure software embodiment, or an embodiment combining software and hardware. Furthermore, the embodiments of the present disclosure may take the form of a computer program product implemented on one or more computer available storage mediums (including but not limited to disk memories, CD-ROM, optical storage devices, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processing machine, or other programmable data processing devices to produce a machine, so that the instructions executed by the processor of the computer or other programmable data processing device generate an apparatus for implementing functions specified in one or more flows in the flowchart and/or in one or more blocks in the block diagram.

These computer program instructions may also be stored in a computer readable memory capable of directing a computer or other programmable data processing device to operate in a particular manner, so that the instructions stored in the computer readable memory generate a manufactured product including an instruction apparatus, where the instruction apparatus implements the functions specified in one or more flows in the flowchart and/or one or more blocks in the block diagram.

These computer program instructions can also be loaded onto a computer or other programmable data processing device, so that a series of operating steps may be performed on the computer or other programmable device to generate computer-implemented processing, and thus instructions executed on the computer or other programmable device provide steps for implementing the function specified in one or more flows in the flowchart and/or one or more blocks in the block diagram.

In a typical configuration, the computing device may include one or more central processing units (CPU), an input/output interface, a network interface and an internal memory.

The internal memory may include anon-permanent memory in the computer readable storage medium, a random access memory (RAM) and/or non-volatile memory and the like, for example, Read Only Memory (ROM) or flash memory. The internal memory is an example of the computer readable medium.

The computer readable storage medium includes permanent, non-permanent, removable and non-removable media, which can realize information storage by any method or technology. The information may be computer readable instructions, data structures, program modules and other data. The examples of the computer storage medium include but not limited to: phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage or other magnetic storage device or other non-transmission medium for storing information accessible by computing devices. As defined in the present disclosure, the computer readable medium does not include transitory computer readable media such as modulated data signals or carriers.

It should be noted that the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including these elements.

Persons skilled in the art shall understand that one or more embodiments of the present disclosure may be provided as methods, systems, or computer program products. Thus, one or more embodiments of the present disclosure may be adopted in the form of entire hardware embodiments, entire software embodiments or embodiments combining software and hardware. Further, one or more embodiments of the present disclosure may be adopted in the form of computer program products that are implemented on one or more computer available storage media (including but not limited to magnetic disk memory, CD-ROM, and optical memory and so on) including computer available program codes.

The present disclosure can be described in a general context of the computer executable instructions executable by the computer, for example, program module. Generally, the program module includes routine, program, object, component and data structure and the like for performing specific task or implementing a specific abstract data type. The present disclosure may also be practiced in a distributed computing environments, and in these distributed computing environments, tasks are performed by a remote processing device connected via communication network. In the distributed computing environments, the program module may be located in local or remote computer storage medium including a storage device.

Different embodiments in the present disclosure are all described in a progressive manner. Each embodiment focuses on the differences from other embodiments with those same or similar parts among the embodiments referred to each other. Particularly, since the system embodiments are basically similar to the method embodiments, the system embodiments are briefly described with relevant parts referred to the descriptions of the method embodiments.

The invention claimed is:

1. A data storage system, comprising: a server, a client and a control end, wherein
the control end is configured to provide a programming environment for a first user, generate a configuration file based on programming information written by the first user in the programming environment, and send the configuration file to the client and the server;
the client is configured to receive the configuration file, generate an encapsulation rule based on first configuration information in the configuration file, generate a storage request corresponding to a byte stream of target information in response to a specified operation of a second user, perform encapsulation on the storage request based on the encapsulation rule to obtain a message packet, and send the message packet to the server;
the server is configured to receive the configuration file, generate at least one extraction unit matching the encapsulation rule based on second configuration information in the configuration file, generate an action unit corresponding to at least one group of storage actions based on third configuration information in the configuration file, analyze the message packet after receiving the message packet to obtain the target information, write the target information into each extraction unit, read action information from a specified extraction unit and determine an action unit matching the action information as a target action unit, and execute the storage actions corresponding to the target action unit to store byte stream data of the target information,
wherein the control end, the server and the client are implemented by different computer devices;
the client comprises a user interaction interface, a transmit-receive module, a programmable encapsulation module, an encapsulation instruction set and an encapsulation register;
the control end comprises a controller which provides the programming environment;
the server comprises: a programmable extraction module, a programmable action module and a programmable service module, wherein
the programmable extraction module is configured to load the configuration file, generate each extraction unit based on the second configuration information, and analyze the message packet based on the configuration file to extract the target information and write the target information into an extraction register corresponding to each extraction unit;
the programmable action module is configured to load the configuration file, select each target instruction from a preset action instruction set based on the third configuration information, combine the storage action corresponding to each target instruction, and generate each action unit based on each group of storage actions;

the programmable service module is configured to load the configuration file, based on fourth configuration information in the configuration file, take the action information stored in the extraction register corresponding to the specified extraction unit as a matching object and determine a matching value, and match the target action unit based on the matching value.

2. The data storage system of claim 1, wherein
the programmable encapsulation module is configured to load the configuration file, generate at least one encapsulation unit based on the first configuration information, and sort each encapsulation unit to obtain the encapsulation rule;
the encapsulation instruction set is configured to abstract an operation involved in a process of performing encapsulation on the byte stream of the target information based on the encapsulation rule;
wherein abstracting the operation involved in the process of performing encapsulation on the byte stream of the target information based on the encapsulation rule comprises:
extracting a field length, switching between integer and character string, and copying a character string.

3. The data storage system of claim 1, wherein the server is further configured to, based on the configuration file, update configurations corresponding to the programmable extraction module, the programmable action module and the programmable service module.

4. The data storage system of claim 1, wherein the configuration of the programmable extraction module comprises: extraction position offset amount, extraction character length, and extraction terminator and associated extraction register;
the offset amount comprises a fixed value and a variable value and the variable value is determined based on the terminator;
the character length comprises a fixed length and a variable length, and the variable length is determined based on the terminator.

5. The data storage system of claim 1, wherein the programmable action module comprises: a basic action table and an action unit, and the action unit is configured to select a storage action corresponding to a specified register from the basic action table and perform association.

6. The data storage system of claim 1, wherein the server is further configured to:
based on the fourth configuration information in the configuration file, generate a service table, and associate each specified extraction unit with each action unit in the service table, and
based on the action information in the specified extraction unit, search the service table, and take an action unit obtained from the service table as the target action unit.

7. The data storage system of claim 1, wherein the server is further configured to return an execution result of the storage actions corresponding to the target action unit to the client.

8. A data storage method, comprising:
obtaining, by a server, a message packet from a client, and analyzing the message packet to obtain target information; wherein the message packet is obtained after the client generates a storage request corresponding to a byte stream of the target information in response to a specified operation of a second user, and performs encapsulation on the storage request based on an encapsulation rule, the encapsulation rule is generated by the client based on first configuration information in a configuration file sent by a control end, and the configuration file is generated by the control end based on programming information written by a first user in a programming environment;
writing the target information into each extraction unit;
reading action information from a specified extraction unit and determining an action unit matching the action information as a target action unit, wherein the server comprises at least one extraction unit generated based on second configuration information in the configuration file and at least one action unit generated based on third configuration information in the configuration file, each extraction unit matches the encapsulation rule and each action unit corresponds to one group of storage actions; and
executing the storage actions corresponding to the target action unit to store byte stream data of the target information,
wherein the control end, the server and the client are implemented by different computer devices;
the client comprises a user interaction interface, a transmit-receive module, a programmable encapsulation module, an encapsulation instruction set and an encapsulation register;
the control end comprises a controller which provides the programming environment;
the server comprises: a programmable extraction module, a programmable action module and a programmable service module;
wherein before analyzing the message packet, the method further comprises:
by the programmable action module in the server, loading the configuration file, selecting each target instruction from a preset action instruction set based on the third configuration information, combining the storage action corresponding to each target instruction, and generating each action unit based on each group of storage actions;
reading the action information from the specified extraction unit and determining the action unit matching the action information as a target action unit comprise:
by the programmable service module in the server, loading the configuration file, based on fourth configuration information in the configuration file, taking the action information stored in an extraction register corresponding to the specified extraction unit as a matching object and determining a matching value, and matching the target action unit based on the matching value.

9. The method of claim 8, wherein
the encapsulation rule is obtained after the programmable encapsulation module loads the configuration file, generates at least one encapsulation unit based on the first configuration information and sorts each encapsulation unit, and an operation involved in a process of performing encapsulation on the byte stream of the target information based on the encapsulation rule is abstracted based on the encapsulation instruction set,
wherein abstracting the operation involved in the process of performing encapsulation on the byte stream of the target information based on the encapsulation rule comprises:
extracting a field length, switching between integer and character string, and copying a character string.

10. The method of claim 8,
further comprising:
based on the configuration file, updating configurations corresponding to the programmable extraction module, the programmable action module and the programmable service module.

11. The method of claim 10, wherein the configuration of the programmable extraction module comprises extraction position offset amount, extraction character length, and extraction terminator and associated extraction register; the offset amount comprises a fixed value and a variable value and the variable value is determined based on the terminator; the character length comprises a fixed length and a variable length, and the variable length is determined based on the terminator.

12. The method of claim 8, wherein the programmable action module comprises: a basic action table and an action unit;
generating each action unit based on each group of storage actions comprises:
by using the action unit, selecting a storage action corresponding to a specified register from the basic action table and performing association.

13. The method of claim 8, wherein
before analyzing the message packet, the method further comprises:
based on the fourth configuration information in the configuration file, generating, by the server, a service table, and associating each specified extraction unit with each action unit in the service table,
reading the action information from the specified extraction unit and determining the action unit matching the action information as the target action unit comprise:
based on the action information in the specified extraction unit, searching the service table, and taking an action unit obtained from the service table as the target action unit.

14. The method of claim 8, further comprising:
returning an execution result of the storage actions corresponding to the target action unit to the client.

15. A non-transitory computer readable storage medium, storing computer programs thereon, wherein the computer programs, when executed by a processor, cause the processor to perform the method of claim 8.

16. An electronic device, comprising:
a processor; and
a memory storing computer programs executable by the processor,
wherein the processor is configured to, when executing the computer programs, perform operations comprising:
obtaining, by a server, a message packet from a client, and analyzing the message packet to obtain target information; wherein the message packet is obtained after the client generates a storage request corresponding to a byte stream of the target information in response to a specified operation of a second user, and performs encapsulation on the storage request based on an encapsulation rule, the encapsulation rule is generated based on first configuration information in a configuration file sent by a control end, and the configuration file is generated by the control end based on programming information written by a first user in a programming environment;
writing the target information into each extraction unit;
reading action information from a specified extraction unit and determining an action unit matching the action information as a target action unit, wherein the server comprises at least one extraction unit generated based on second configuration information in the configuration file and at least one action unit generated based on third configuration information in the configuration file, each extraction unit matches the encapsulation rule and each action unit corresponds to one group of storage actions; and
executing the storage actions corresponding to the target action unit to store byte stream data of the target information,
wherein the control end, the server and the client are implemented by different computer devices;
the client comprises a user interaction interface, a transmit-receive module, a programmable encapsulation module, an encapsulation instruction set and an encapsulation register;
the control end comprises a controller which provides the programming environment;
the server comprises: a programmable extraction module, a programmable action module and a programmable service module;
wherein before analyzing the message packet, the operations further comprise:
by the programmable action module in the server, loading the configuration file, selecting each target instruction from a preset action instruction set based on the third configuration information, combining the storage action corresponding to each target instruction, and generating each action unit based on each group of storage actions;
reading the action information from the specified extraction unit and determining the action unit matching the action information as a target action unit comprise:
by the programmable service module in the server, loading the configuration file, based on fourth configuration information in the configuration file, taking the action information stored in an extraction register corresponding to the specified extraction unit as a matching object and determining a matching value, and matching the target action unit based on the matching value.

* * * * *